Jan. 16, 1951    C. GUILER ET AL    2,538,683
FLUID SEAL
Filed Jan. 31, 1948    2 Sheets-Sheet 1
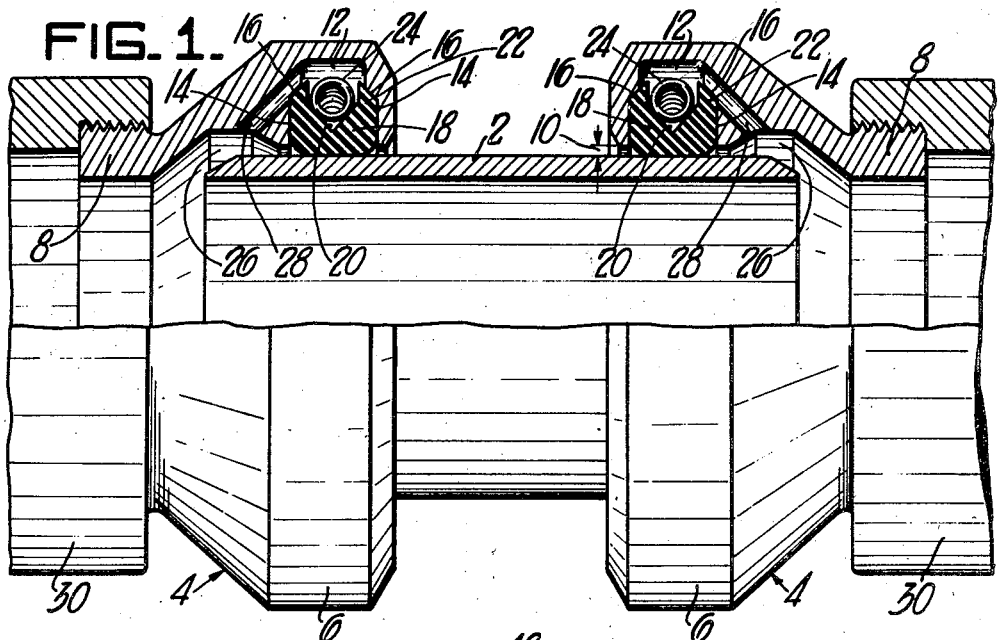
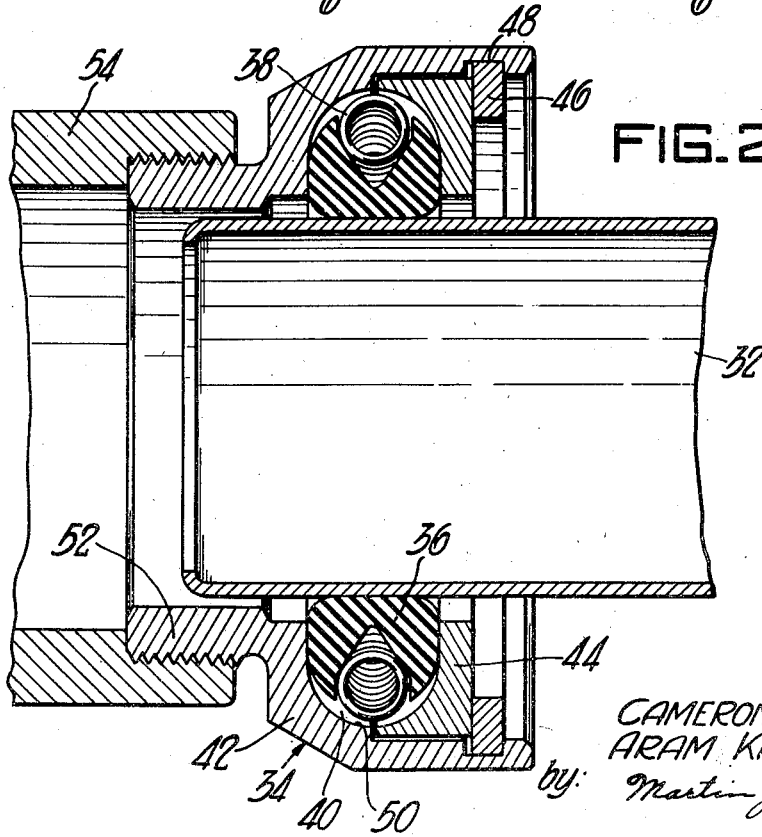
INVENTORS:
CAMERON GUILER and
ARAM KALENIAN,
by: Martin J. Carroll
their Attorney.

Jan. 16, 1951     C. GUILER ET AL     2,538,683
FLUID SEAL
Filed Jan. 31, 1948     2 Sheets-Sheet 2
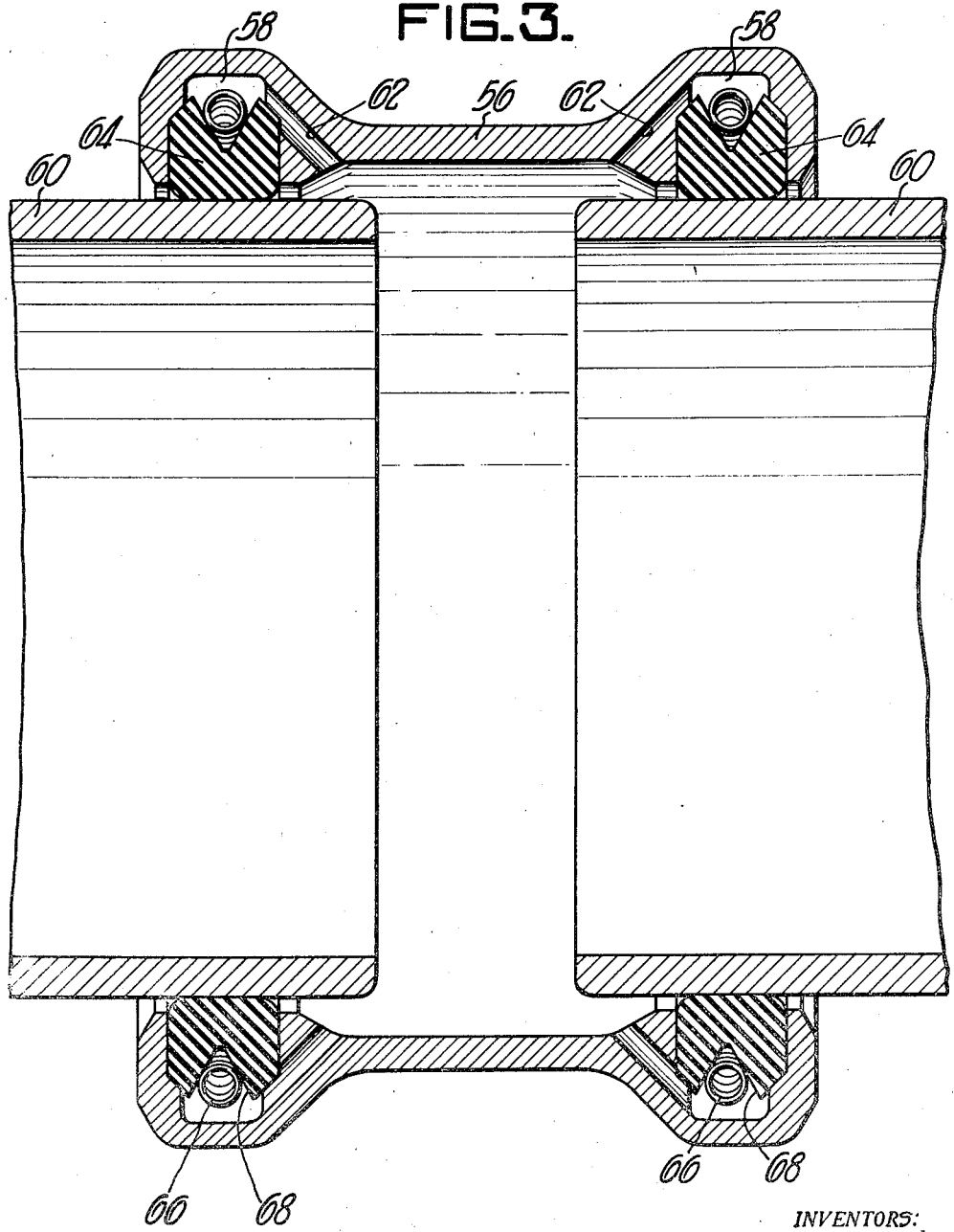
INVENTORS:
CAMERON GUILER and
ARAM KALENIAN,
by: Martin J. Carroll
their Attorney Patented Jan. 16, 1951

2,538,683

UNITED STATES PATENT OFFICE 2,538,683

FLUID SEAL

Cameron Guiler and Aram Kalenian,
Westboro, Mass.

Application January 31, 1948, Serial No. 5,558

8 Claims. (Cl. 285—163)

This invention relates to a fluid seal and more particularly to a fluid seal particularly adapted for use with aircraft engines. Due to vibration in aircraft engines as well as in other machines, it is unsatisfactory and dangerous to connect two cylindrical members together by means of a rigid joint. Ordinary flexible joints, such as various type of rubber hose, are also unsatisfactory because of the vibrations which subject them to a great number of transverse, axial, and rotary stresses. When such joints were used in the past they had to be replaced frequently to prevent oil or other fluids from leaking out through loose or worn connections. It has been known to use fluid seals at the connections, but these have not given satisfactory service. In some instances the seals function properly when new, but soon become worn and must be replaced.

It is an object of our invention to provide a fluid seal which is self-adjusting.

Another object is to provide a seal which prevents detrimental metal to metal contact between the parts thereof.

A further object is to provide a coupling having our improved seal incorporated therein to prevent contact between metallic parts.

These and other objects will be more apparent after referring to the following specification and attached drawings, in which:

Figure 1 is a view, partly in section, of one embodiment of our invention;

Figure 2 is a sectional view of a second embodiment of our invention; and

Figure 3 is a sectional view of a third embodiment of our invention.

Referring more particularly to Figure 1 which shows our invention as incorporated in a coupling, the reference numeral 2 indicates a chrome plated tube having its ends bevelled as shown to facilitate assembly and to prevent damage to the sealing element. A housing 4 surrounds each end of the tube and is made up of an enlarged portion 6 and a generally tubular portion 8 which extends past the end of the tube 2. The internal diameter of the portion 6 is somewhat greater than the outside diameter of the tube 2 so that a space 10 is provided between the tube 2 and the portion 6. The portion 6 is provided with an inwardly facing channel 12 which has straight sides 14 terminating in shoulders 16 which are formed by a decrease in width of the channel 12. Disposed in the channel 12 is an annular resilient sealing element 18 made of rubber or like material which is substantially impervious to the fluid flowing in the tube 2.

The internal diameter of the sealing element 18 is slightly smaller than the outside diameter of the tube 2 and its width is slightly greater than the width of the channel 12. The inner diameter of element 18 is arcuate so as to effectively seal the joint under misaligned conditions and to aid in assembly. The sides of the element 18 in contact with the sides 14 of channel 12 are straight so that the element 18 cannot twist. The outer diameter of the element 18 is provided with a substantially V-shaped groove 20 therein with a relatively thin portion 22 on each side thereof, the ends of which are bevelled and bear against the shoulders 16. Disposed in the groove 20 is a garter spring 24 which is normally of less internal diameter than the diameter of the point where it bears on groove 20 so that it urges the element 18 against the tube 2 and at the same time urges the thin portions 22 against the sides 14 of channel 12. For best results we have found that the angle formed by the sides of V-groove 20 should be between 60 and 90°. However, the groove 20 need not be perfectly V-shaped with the angles of the size stated since it is only necessary that the groove be shaped so that the thin portions 22 be cammed outwardly as the spring 24 contracts. Any such groove may be termed "substantially V-shaped" and it is in this sense that the term is used in the specification and claims. Between the portions 6 and 8 the internal diameter of the housing is enlarged to form a recess 26. Between the recess 26 and the bottom of the channel 12 is one or more passageways 28. The outside diameter of portion 8 is threaded to receive the internally threaded tubular fluid carrying member 30. It will of course be understood that more than one sealing element and groove could be used if desired.

It will be seen that the above described coupling will connect the members 30 without any metal to metal contact between those parts of the coupling which might have relative movement therebetween during service. The garter spring 24 continually keeps the sealing element 18 compressed against the tube 2 to prevent passage of fluid along the outside of tube 2. At the same time the spring causes the thin portions 22 to tightly engage the sides of the channel 12 at all times. Pressure within the tube 2 and the bottom of channel 12 is equalized by means of recess 26 and passageways 28. Axial and lateral movement of tube 2 is permitted by the sealing elements 18 without permitting passage of any fluid. Seals as described above have successfully completed overload endurance engine tests of 180 hours on aircraft engines.

Figure 2 shows a slightly different embodiment of our invention in which the reference numeral 32 indicates a tube located within a housing 34. This embodiment is particularly adapted for use with small diameter tubes in which it is difficult to insert a sealing element 36 and garter spring 38 within the channel 40. For this reason the housing 34 is made up of several individual parts. The main portion 42 of the housing forms one-half of the channel 40 while the other half is formed in an annular member 44 which is held in place by a Truarc snap ring 46 which fits into an annular groove 48 in member 42. The annular channel 40 in this embodiment has an arcuate bottom 50 with the sealing element 36 being similarly shaped. The inner diameter and sides of element 36 have the same relative size and shape as element 18 in the first embodiment. The tube 32 extends substantially through the housing 34 into the substantially tubular portion 52 thereof. The outside surface of portion 52 is threaded to receive the internally threaded tubular member 54. If desired pressure equalizing passageways can be provided.

The coupling of Figure 2 functions in substantially the same manner as one end of the coupling of Figure 1. There is no detrimental metal to metal contact and garter spring 38 keeps the sealing element 35 in tight engagement against the tube 32 and the sides of channel 40.

Figure 3 shows another embodiment of our invention in which a tubular coupling member 56 is provided. Each end of member 56 has an inwardly facing channel 58 therein which is shaped in the same manner as channel 12. The internal diameter of the ends of member 56 is somewhat greater than the outside diameters of tubes 60 which are being connected. Pressure between the tubes 60 and the bottom of channel 58 is equalized by means of passageways 62. The sealing member 64 is shaped in the same manner as member 18 and its internal diameter is slightly smaller than the outside diameter of tubes 60 and its width is slightly greater than the width of channel 58 to provide an effective seal. A garter spring 66 surrounds the member 64 and is located in a V-shaped groove 68. The operation of this device is similar to that of Figures 1 and 2.

While three embodiments of our invention have been shown and described it will be apparent that other adaptations and modifications may be made without departing from the scope of the following claims.

We claim:

1. A fluid seal between two members disposed one within the other which comprises an annular resilient sealing element, one of said members having an annular channel therearound for snugly receiving said sealing element, one end of said sealing element contacting the second of said members, the opposite end of said sealing element having a circumferential substantially V-shaped groove therein, a relatively thin portion on each side of said groove, and means in said groove for urging said sealing element against the second of said members and the thin portions against the sides of said channel, said members having a space therebetween with the resilient element extending from the channel across said space and bearing against the second of said members, the ends of said thin portions bearing against a bottom surface of said channel, and straight portions on the sides of said resilient element substantially perpendicular to the axis of said first member.

2. A fluid seal according to claim 1 in which the surface of said sealing element bearing against said second member is arcuate.

3. A fluid seal for a cylindrical member comprising a housing around said cylindrical member, said housing having an annular channel therein, an annular resilient sealing element disposed in said channel, said element having a normal width greater than the width of said channel and an inside diameter less than the outside diameter of the cylindrical member, the end of said element adjacent the bottom of said channel having a circumferential substantially V-shaped groove therein, a relatively thin portion on each side of said groove, and a spring in said groove surrounding said element to urge it against the cylindrical member and to force the thin portions against the sides of said channel, said cylindrical member and housing having a space therebetween with the resilient element extending from the channel across said space and bearing against said cylindrical member, the ends of said thin portions bearing against a bottom surface of said channel, and straight portions on the sides of said resilient element substantially perpendicular to the axis of said housing.

4. A fluid seal according to claim 3 in which the surface of said sealing element bearing against said cylindrical member is arcuate.

5. A coupling comprising a cylindrical member, a housing around at least one end of said member, said housing having an annular channel therein, an annular resilient sealing element disposed in said channel, said element having a normal width greater than the width of said channel and an inside diameter less than the outside diameter of the cylindrical member, the end of said element adjacent the bottom of said channel having a circumferential substantially V-shaped groove therein, a relatively thin portion on each side of said groove, and a spring in said groove surrounding said element to urge it against the cylindrical member and to force the thin portions against the sides of said channel, said cylindrical member and housing having a space therebetween with the resilient element extending from the channel across said space and bearing against said cylindrical member, the ends of said thin portions bearing against a bottom surface of said channel, and straight portions on the sides of said resilient element substantially perpendicular to the axis of said housing.

6. A coupling according to claim 5 in which the surface of said sealing element bearing against said cylindrical member is arcuate.

7. A fluid seal for a cylindrical member comprising a housing around said cylindrical member, said housing having an annular opening therein surrounding the cylindrical member, an annular member in said opening, means for detachably holding said annular member in said opening, said annular opening and said annular member being shaped to form an annular channel surrounding said cylindrical member, an annular resilient sealing element disposed in said channel, said element having a normal width greater than the width of said channel and an inside diameter less than the outside diameter of the cylindrical member, the end of said element adjacent the bottom of said channel having a circumferential substantially V-shape groove therein, a relatively thin portion on each side of said groove, and a spring in said groove surrounding said element to urge it against the cylindrical member and to force the thin portions against the sides of said channel, said cylindrical member and housing having a space therebetween with the resilient element extending from the channel across said space and bearing against said cylindrical member, the ends of said thin portions bearing against a bottom surface of said channel, and straight portions on the sides of said resilient element substantially perpendicular to the axis of said housing.

8. A coupling comprising a cylindrical member, a housing around at least one end of said member, said housing having an annular opening therein surrounding the cylindrical member, an annular member in said opening, means for detachably holding said annular member in said opening, said annular opening and said annular member being shaped to form an annular channel surrounding said cylindrical member, an annular resilient sealing element disposed in said channel, said element having a normal width greater than the width of said channel and an inside diameter less than the outside diameter of the cylindrical member, the end of said element adjacent the bottom of said channel having a circumferential substantially V-shaped groove therein, a relatively thin portion on each side of said groove, and a spring in said groove surrounding said element to urge it against the cylindrical member and to force the thin portions against the sides of said channel, said cylindrical member and housing having a space therebetween with the resilient element extending from the channel across said space and bearing against said cylindrical member, the ends of said thin portions bearing against a bottom surface of said channel, and straight portions on the sides of said resilient element substantially perpendicular to the axis of said housing.

CAMERON GUILER.
ARAM KALENIAN.

REFERENCES CITED

The following references are of record in the file of this patent:

UNITED STATES PATENTS

| Number | Name | Date |
|---|---|---|
| 373,256 | Traver et al. | Nov. 15, 1887 |
| 1,861,755 | Rasmussen | June 7, 1932 |
| 1,986,285 | Pollitz | Jan. 1, 1935 |
| 2,126,505 | Risser | Aug. 9, 1938 |
| 2,319,392 | Dick | May 18, 1943 |